(12) United States Patent
Hayashi

(10) Patent No.: US 7,643,028 B2
(45) Date of Patent: Jan. 5, 2010

(54) IMAGE GENERATION PROGRAM PRODUCT AND IMAGE GENERATION DEVICE

(75) Inventor: Norikazu Hayashi, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 519 days.

(21) Appl. No.: 11/512,273

(22) Filed: Aug. 30, 2006

(65) Prior Publication Data

US 2007/0046667 A1    Mar. 1, 2007

(30) Foreign Application Priority Data

Aug. 31, 2005   (JP) .............................. 2005-252316

(51) Int. Cl.
*G06T 15/00*   (2006.01)
(52) U.S. Cl. ..................... 345/427; 345/629; 345/581; 348/586; 359/462; 715/201
(58) Field of Classification Search ................ 345/427, 345/629, 630, 581, 592; 348/586; 359/462; 715/201
See application file for complete search history.

(56) References Cited

U.S. PATENT DOCUMENTS

| | | | | |
|---|---|---|---|---|
| 5,479,597 A * | 12/1995 | Fellous | ........................ | 715/201 |
| 5,598,297 A * | 1/1997 | Yamanaka et al. | .......... | 359/462 |
| 6,335,765 B1 * | 1/2002 | Daly et al. | ................... | 348/586 |
| 6,400,373 B1 * | 6/2002 | Uchiyama et al. | ........... | 345/629 |
| 6,437,777 B1 * | 8/2002 | Kamachi et al. | ............. | 345/419 |
| 6,657,637 B1 * | 12/2003 | Inagaki et al. | ................ | 345/629 |
| 7,091,093 B1 * | 8/2006 | Noda et al. | .................. | 438/276 |
| 7,116,342 B2 * | 10/2006 | Dengler et al. | ............... | 345/630 |
| 7,193,629 B2 * | 3/2007 | Kake et al. | ................... | 345/581 |
| 7,310,098 B2 * | 12/2007 | Ohba | .......................... | 345/428 |
| 7,479,967 B2 * | 1/2009 | Bachelder et al. | ........... | 345/592 |

OTHER PUBLICATIONS http://www.microsoft.com/japan/msdn/academic/Articles/DirectX/06, and excerpt translation of Section 6.3.2(1), Aug. 2003, pp. 1-12.

* cited by examiner

*Primary Examiner*—Phu K Nguyen
(74) *Attorney, Agent, or Firm*—Finnegan, Henderson, Farabow, Garrett & Dunner, L.L.P.

(57) ABSTRACT

This program product causes a computer to function as the respective units for (a) arranging a model configured by intersecting a plurality of plate-shaped polygons in a virtual space, (b) calculating a parameter dependent on an angle formed from a first vector set in association with the model and a second vector set in association with the line of sight of the virtual camera, (c) selecting as a display target one among the plurality of plate-shaped polygons configuring the model according to the parameter, (d) mapping a prescribed texture to the plate shaped polygon selected with the polygon selection unit, and (e) generating an image obtained by performing perspective projection to the inside of the virtual space, in which the model mapped with the texture is arranged, on a perspective projection plane set in correspondence with a visual point of the virtual camera.

12 Claims, 12 Drawing Sheets

| PLATE-SHAPED POLYGON | APEX DATA |
|---|---|
| FIRST POLYGON PG1 | (1, 2, 3, 4) |
| SECOND POLYGON PG1 | (5, 6, 7, 8) |
| THIRD POLYGON PG1 | (9, 10, 11, 12) |
| ⋮ | ⋮ |
| FIRST POLYGON PG2 | (101, 102, 103, 104) |
| SECOND POLYGON PG2 | (105, 106, 107, 108) |
| THIRD POLYGON PG2 | (109, 110, 111, 112) |
| ⋮ | ⋮ |
| FIRST POLYGON PG3 | (201, 202, 203, 204) |
| SECOND POLYGON PG3 | (205, 206, 207, 208) |
| THIRD POLYGON PG3 | (209, 210, 211, 212) |
| ⋮ | ⋮ |

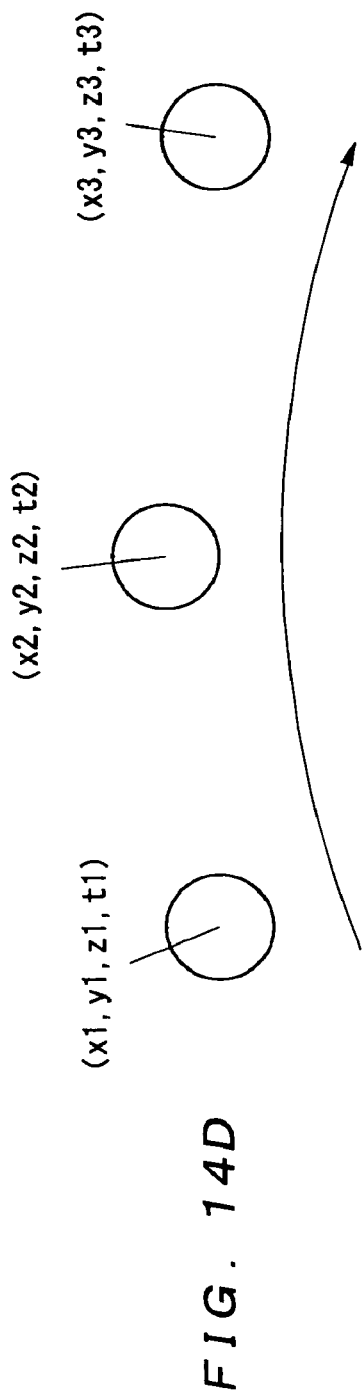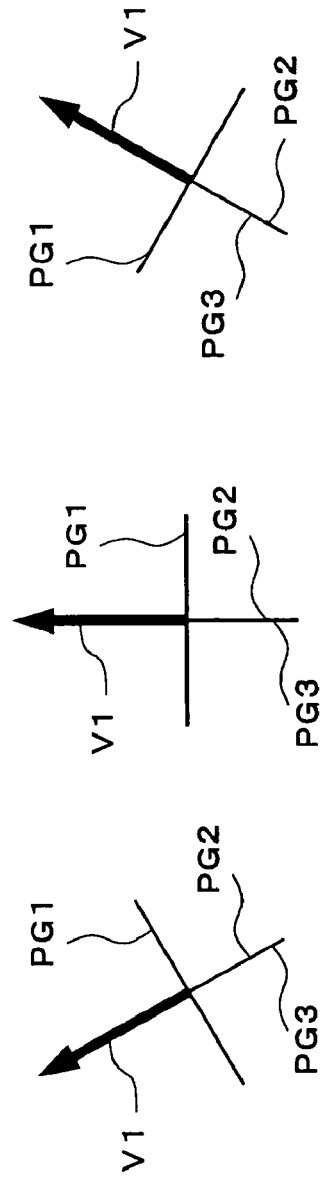
FIG. 14D
FIG. 14A  FIG. 14B  FIG. 14C

IMAGE GENERATION PROGRAM PRODUCT AND IMAGE GENERATION DEVICE

CROSS-REFERENCES

The entire disclosure of Japanese Patent Application No. 2005-252316 filed on Aug. 31, 2005 including specification, claims, drawings and summary are incorporated herein by reference in its entirety.

BACKGROUND

The present invention generally relates to technology for generating a two-dimensional image by subjecting an event set in a virtual three-dimensional space to perspective projection transformation, and in particular relates to image processing technology capable of alleviating the computational load upon more realistically representing numerous spectators in a game device or the like relating to sports.

Pursuant to the development of computer technology in recent years, image processing technology relating to TV game machines and simulators (simulation rides) is becoming universally prevalent. In this kind of system, the rich expression of images to be displayed is key in increasing the commercial value. For instance, in a TV game machine related to sports such as tennis or soccer, it is desirable to realistically express the behavior of sports players to be operated by a player as well as realistically express the behavior of the attending spectators in order to further increase the commercial value. Meanwhile, by attempting to improve the expressiveness of images, the computational load required in generating such images tends to increase. Since TV games and the like are demanded of real-time processing for generating images, there is a certain limit in the tolerable computational load. Therefore, technology capable of alleviating the computational load without deteriorating the expressiveness is sought after.

As conventional technology trying to meet the foregoing demands, there is a method that applies technology referred to as billboard processing (refer to Non-Patent Document 1). Specifically, this method represents a target body such as spectators based on a two-dimensional model using plate-shaped polygons, appropriately rotates the plate-shaped polygons (two-dimensional models) according to a line-of-sight vector showing the line of sight of a virtual camera, and thereafter replaces the texture to be mapped to the plate-shaped polygons.

Nevertheless, even in the case of the foregoing method, since coordinate conversion processing must be performed to the coordinate components (x, y, z components of the respective apexes) or the normal line components of the four apexes of the plate-shaped polygons, the effect of alleviating the computational load is low when trying to represent numerous spectators. Therefore, technology capable of achieving further reduction of the computational load without deteriorating the expressiveness of images concerning spectators or the like is sought after.

[Non-Patent Document 1]

Shigenori Tanaka et al., "Introduction to Game Programming with DirectX: Chapter 6—Practical Game Development: 6.3.2 Billboard Drawing", [online], Aug. 29, 2003, Microsoft Corporation, [Searched on Aug. 25, 2005] Internet <URL: http://www.microsoft.com/japan/msdn/academic/Articles/DirectX/06/>

SUMMARY

Accordingly, an object of the present invention is to provide image processing technology capable of reducing the computational load without deteriorating the expressiveness of spectators or the like.

In one aspect of the present invention, provided is a program product (image generation program product) for generating an image of a virtual three-dimensional space viewed from a virtual camera. This program product causes a computer to function as:

(a) a model arrangement unit for arranging a model configured by intersecting a plurality of plate-shaped polygons in the virtual three-dimensional space, (b) a parameter calculation unit for calculating a parameter dependent on an angle formed from a first vector set in association with the model and a second vector set in association with the line of sight of the virtual camera, (c) a polygon selection unit for selecting as a display target one among the plurality of plate-shaped polygons configuring the model according to the parameter, (d) a mapping unit for mapping a prescribed texture to the plate shaped polygon selected with the polygon selection unit, and (e) an image generation unit for generating a two-dimensional image obtained by performing perspective projection to the inside of the virtual three-dimensional space, in which the model mapped with the texture is arranged, on a perspective projection plane set in correspondence with a visual point of the virtual camera.

In the foregoing invention, after pre-arranging the model, one of the plate-shaped polygons is selected in correspondence to changes in the line of sight of the virtual camera, and the display is changed by mapping a prepared texture to the selected polygon. Therefore, since it is not necessary to move (for example, rotate) the respective apexes of the plate-shaped polygons configuring the model even when the line of sight of the virtual camera is changed, it is possible to reduce the computational load without deteriorating the expressiveness. In particular, when displaying numerous spectators, it is possible to considerably reduce the computational load by representing the respective spectators with the foregoing model.

In another aspect of the present invention, provided is a program product (image generation program product) for generating an image of a virtual three-dimensional space viewed from a virtual camera. This program product causes a computer to function as:

(a) a model arrangement unit for arranging a plurality of models each configured by intersecting a plurality of plate-shaped polygons in the virtual three-dimensional space, (b) a grouping unit for grouping the plurality of models into groups in which the directions of a first vector set in association with each of the models coincide, (c) a parameter calculation unit for performing to each of the groups processing for calculating a parameter dependent on an angle formed from the first vector and a second vector set in association with the line of sight of the virtual camera regarding one of the models belonging to the same group, (d) a polygon selection unit for performing to each of the groups processing for selecting as a display target one among the plurality of plate-shaped polygons configuring the model according to the parameter calculated regarding the group with respect to each of the models belonging to the same group, (e) a mapping unit for mapping a prescribed texture to the plate-shaped polygon selected with the polygon selection unit regarding each of the plurality of models; and (f) an image generation unit for generating a two-dimensional image obtained by performing perspective projection to the inside of the virtual three-dimensional space, in which the plurality of models mapped with the texture are arranged, on a perspective projection plane set in correspondence with a visual point of the virtual camera.

In the foregoing invention, after pre-arranging the model, one of the plate-shaped polygons is selected in correspondence to changes in the line of sight of the virtual camera, and the display is changed by mapping a prepared texture to the selected polygon. Therefore, since it is not necessary to move (rotate) the respective apexes of the plate-shaped polygons configuring the model even when the line of sight of the virtual camera is changed, it is possible to reduce the computational load without deteriorating the expressiveness. Further, by judging the selected polygon in each of the respective groups regarding one of the models belonging to such group, and applying the judgment result to all other models belonging to the same group, the computational load of parameter calculation processing and polygon selection processing will be considerably reduced. Thereby, even if the number of spectators as the display target is extremely large (for example, several ten thousand people), it is possible to considerably reduce the computational load without deteriorating the expressiveness.

Further advantageous modes regarding the image generation program product of the present invention are now explained.

As the first vector, it is preferable to adopt a normal vector to the surface of any one of the polygons configuring the model.

In many cases, since a normal vector is prepared in the respective polygons as one of the parameters prescribing the relevant polygon, this can be used as the first vector.

As the second vector, it is preferable to use a line-of-sight vector showing the line of sight of the virtual camera, or an inverse vector thereof.

Accordingly, it is possible to obtain a second vector that more accurately reflects the behavior of the virtual camera.

Further, as the parameter, it is preferable to adopt the angle itself formed from the first vector and the second vector, or an inner product value of the first vector and the second vector.

Thereby, it is possible to obtain parameters based on a relatively simple operation.

Further, the model arrangement unit may also be configured to arrange the model so that the direction of the first vector follows the position of a target arranged in the virtual three-dimensional space while maintaining a definite relation. As the target, for instance, an object (such as a ball) that moves in the virtual three-dimensional space can be considered.

Thereby, it is possible to change the display of the model by following the behavior of the target.

According to another aspect of the present invention, provided is an image generation device for generating an image of a virtual three-dimensional space viewed from a virtual camera comprising a model generation unit, a parameter calculation unit, a polygon selection unit, a mapping unit and an image generation unit. The model arrangement unit arranges a model configured by intersecting a plurality of plate-shaped polygons in the virtual three-dimensional space. The parameter calculation unit calculates a parameter dependent on an angle formed from a first vector set in association with the model and a second vector set in association with the line of sight of the virtual camera. The polygon selection unit selects as a display target one among the plurality of plate-shaped polygons configuring the model according to the parameter. The mapping unit maps a prescribed texture to the plate shaped polygon selected with the polygon selection unit. The image generation unit generates a two-dimensional image obtained by performing perspective projection to the inside of the virtual three-dimensional space, in which the model mapped with the texture is arranged, on a perspective projection plane set in correspondence with a visual point of the virtual camera.

In the foregoing invention, after pre-arranging the model, one of the plate-shaped polygons is selected in correspondence to changes in the line of sight of the virtual camera, and the display is changed by mapping a prepared texture to the selected polygon. Therefore, since it is not necessary to move (for example, rotate) the respective apexes of the plate-shaped polygons configuring the model even when the line of sight of the virtual camera is changed, it is possible to reduce the computational load without deteriorating the expressiveness. In particular, when displaying numerous spectators, it is possible to considerably reduce the computational load by representing the respective spectators with the foregoing model.

According to another aspect of the present invention, provided is an image generation device for generating an image of a virtual three-dimensional space viewed from a virtual camera comprising a model generation unit, a grouping unit, a parameter calculation unit, a polygon selection unit, a mapping unit and an image generation unit. The model arrangement unit arranges a plurality of models each configured by intersecting a plurality of plate-shaped polygons in the virtual three-dimensional space. The grouping unit groups the plurality of models into groups in which the directions of a first vector set in association with each of the models coincide. The parameter calculation unit performs to each of the groups processing for calculating a parameter dependent on an angle formed from the first vector and a second vector set in association with the line of sight of the virtual camera regarding one of the models belonging to the same group. The polygon selection unit performs to each of the groups processing for selecting as a display target one among the plurality of plate-shaped polygons configuring the model according to the parameter calculated regarding the group with respect to each of the models belonging to the same group. The mapping unit maps a prescribed texture to the plate-shaped polygon selected with the polygon selection unit regarding each of the plurality of models. The image generation unit generates a two-dimensional image obtained by performing perspective projection to the inside of the virtual three-dimensional space, in which the plurality of models mapped with the texture are arranged, on a perspective projection plane set in correspondence with a visual point of the virtual camera.

In the foregoing invention, after pre-arranging the model, one of the plate-shaped polygons is selected in correspondence to changes in the line of sight of the virtual camera, and the display is changed by mapping a prepared texture to the selected polygon. Therefore, since it is not necessary to move (for example, rotate) the respective apexes of the plate-shaped polygons configuring the model even when the line of sight of the virtual camera is changed, it is possible to reduce the computational load without deteriorating the expressiveness. Further, by judging the selected polygon in each of the respective groups regarding one of the models belonging to such group, and applying the judgment result to all other models belonging to the same group, the computational load of parameter calculation processing and polygon selection processing will be considerably reduced. Thereby, even if the number of spectators as the display target is extremely large (for example, several ten thousand people), it is possible to considerably reduce the computational load without deteriorating the expressiveness.

Further advantageous modes regarding the image generation device of the present invention are now explained.

As the first vector, it is preferable to adopt a normal vector to the surface of any one of the polygons configuring the model.

In many cases, since a normal vector is prepared in the respective polygons as one of the parameters prescribing the relevant polygon, this can be used as the first vector.

As the second vector, it is preferable to use a line-of-sight vector showing the line of sight of the virtual camera, or an inverse vector thereof.

Accordingly, it is possible to obtain a second vector that more accurately reflects the behavior of the virtual camera.

Further, as the parameter, it is preferable to adopt the angle itself formed from the first vector and the second vector, or an inner product value of the first vector and the second vector.

Thereby, it is possible to obtain parameters based on a relatively simple operation.

Further, the model arrangement unit may also be configured to arrange the model so that the direction of a first vector follows the position of the target arranged in the virtual three-dimensional space while maintaining a definite relation. As the target, for instance, an object (such as a ball) that moves in the virtual three-dimensional space can be considered.

Thereby, it is possible to change the display of the model by following the behavior of the target.

Incidentally, the technical idea of the present invention according to the each of the foregoing aspects can also be represented as follows.

According to another aspect of the present invention, provided is a program product for generating an image of a virtual three-dimensional space viewed from a virtual camera. This program product causes a computer to execute the steps of:
(a) arranging a model configured by intersecting a plurality of plate-shaped polygons in the virtual three-dimensional space,
(b) calculating a parameter dependent on an angle formed from a first vector set in association with the model and a second vector set in association with the line of sight of the virtual camera,
(c) selecting as a display target one among the plurality of plate-shaped polygons configuring the model according to the parameter,
(d) mapping a prescribed texture to the plate shaped polygon selected with the polygon selection unit, and
(e) generating a two-dimensional image obtained by performing perspective projection to the inside of the virtual three-dimensional space, in which the model mapped with the texture is arranged, on a perspective projection plane set in correspondence with a visual point of the virtual camera.

According to another aspect of the present invention, provided is a program product for generating an image of a virtual three-dimensional space viewed from a virtual camera. This program product causes a computer to execute the steps of:
(a) arranging a plurality of models each configured by intersecting a plurality of plate-shaped polygons in the virtual three-dimensional space,
(b) grouping the plurality of models into groups in which the directions of the first vector set in association with each of the models coincide,
(c) performing to each of the groups processing for calculating a parameter dependent on an angle formed from the first vector and a second vector set in association with the line of sight of the virtual camera regarding one of the models belonging to the same group,
(d) performing to each of the groups processing for selecting as a display target one among the plurality of plate-shaped polygons configuring the model according to the parameter calculated regarding the group with respect to each of the models belonging to the same group,
(e) mapping a prescribed texture to the plate-shaped polygon selected with the polygon selection unit regarding each of the plurality of models, and
(f) generating a two-dimensional image obtained by performing perspective projection to the inside of the virtual three-dimensional space, in which the plurality of models mapped with the texture are arranged, on a perspective projection plane set in correspondence with a visual point of the virtual camera.

BRIEF DESCRIPTION OF DRAWINGS

FIG. 14A to 14D are diagrams explaining an example of a target arranged in a virtual three-dimensional space and a model arranged to follow the target.

DETAILED DESCRIPTION

A game device is used as an example of the image generation device for explaining the embodiments of the present invention.

Figure 1:
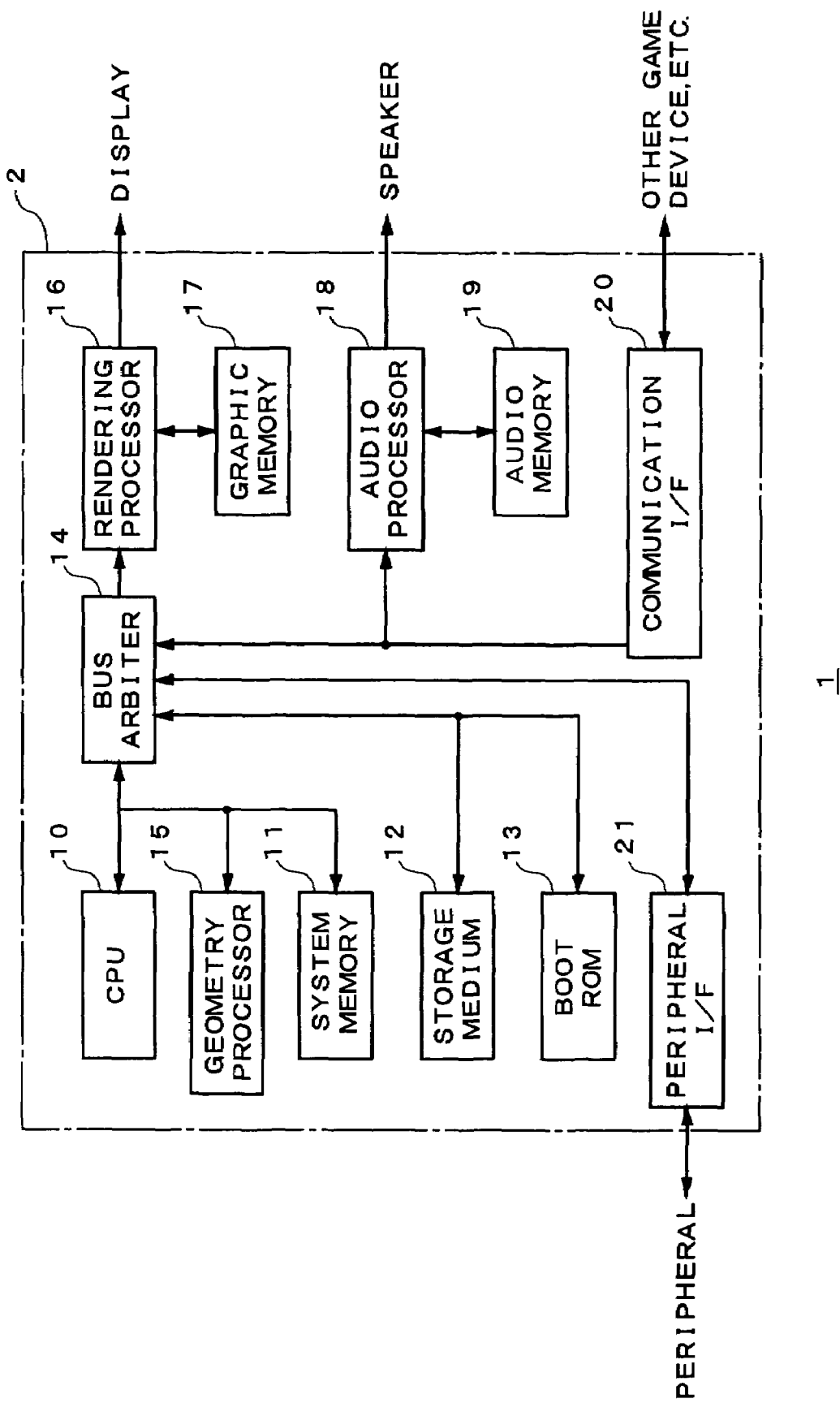
FIG. 1 is a block diagram showing the configuration of a game device according to an embodiment of the present invention.

FIG. 1 is a block diagram showing the configuration of a game device according an embodiment of the present invention. The game device 1 of this embodiment shown in FIG. 1 comprises a CPU (Central Processing Unit) 10, a system memory 11, a storage medium 12, a boot ROM 13, a bus arbiter 14, a geometry processor 15, a rendering processor 16, a graphic memory 17, an audio processor 18, an audio memory 19, a communication interface (I/F) 20, and a peripheral interface 21. In other words, the game device 1 of this embodiment has a computer configured from the foregoing CPU 10, the system memory 11 and the like, and functions as a game device related to sports (tennis for instance) by causing such computer to execute a prescribed program product. Specifically, in order to present the game, the game device 1 sequentially generates two-dimensional images viewed from a virtual camera in the virtual three-dimensional space (game space), and generates sounds such as sound effects.

The CPU (Central Processing Unit) 10 controls the overall game device 1 by executing a prescribed program.

The system memory 11 stores programs and data to be used by the CPU 10.

The storage medium 12 stores game programs and data such as images and sounds. The storage medium 12 as a program data ROM may also be an IC memory such as a masked ROM or flash ROM for electronically reading data, an optical disk such as a CD-ROM or DVD-ROM for optically reading data, a magnetic disk, or the like.

The boot ROM 13 stores a program for initializing the respective blocks upon activating the game device 1.

The bus arbiter 14 controls the bus for exchanging programs and data among the respective blocks.

The geometry processor 15 calculates the positional coordinates and direction of an object, which is to be indicated on a display, in a virtual three-dimensional space (game space).

The rendering processor 16 generates (draws) images to be output to the display based on the direction and positional coordinates of the object calculated with the geometry processor 15.

The graphic memory 17 is connected to the rendering processor 16, and stores data and commands for generating images.

The audio processor 18 generates data for outputting sounds from the speaker. The sound data generated with the audio processor 18 is converted into an analog signal with a digital/analog converter not shown, thereafter input to the speaker, and then output as sound from the speaker.

The audio memory 19 is a part of the audio processor 18, and stores data and commands for generating sounds.

The communication interface (I/F) 20 performs communication processing when the game device 1 needs to perform data communication with another game device, a server device or the like.

The peripheral interface (I/F) 21 has a built-in interface for inputting and outputting data to and from the outside, and a peripheral as a peripheral device is connected thereto. Here, a peripheral includes a mouse (pointing device), a keyboard, a switch for performing key operations such as a game controller, a touch pen, as well as any other component such as a backup memory for storing the intermediate step or generated data of the program, a display device, a photographic device or the like that can be connected to the image processing device or another peripheral.

Incidentally, the system memory 11, the graphic memory 17, and the sound memory 19 may be shared for the respective functions by connecting one memory to the bus arbiter 14. Further, the respective functional blocks merely need to exist in the image processing unit 2 as functions, and the functional blocks may be connected to each other, or the respective constituent elements inside the functional blocks may be separated as another block.

Figure 2:
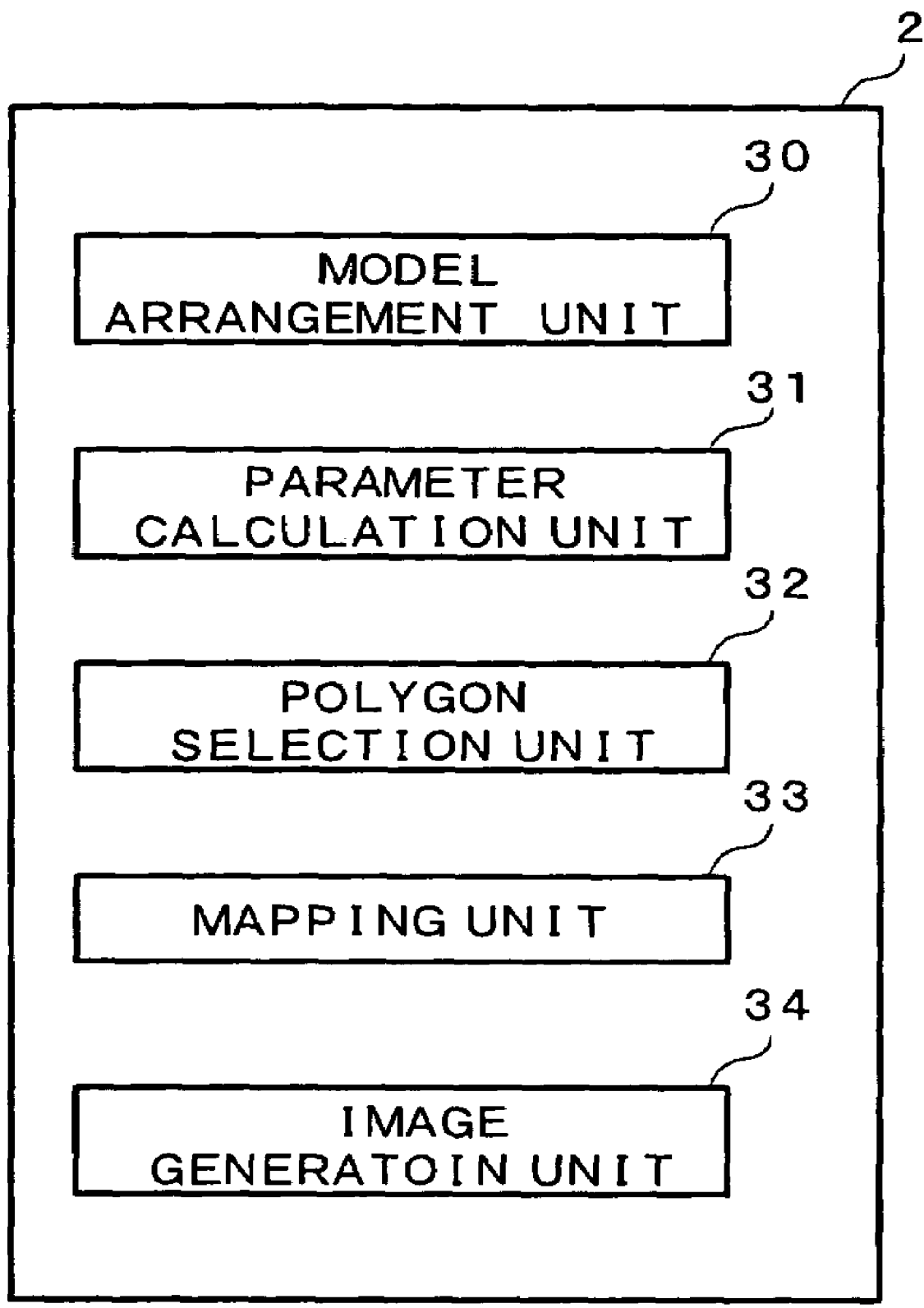
FIG. 2 is a functional block diagram in the case of representing the configuration of an image processing unit according to an embodiment of the present invention while focusing on the image generation function.
Figure 3:
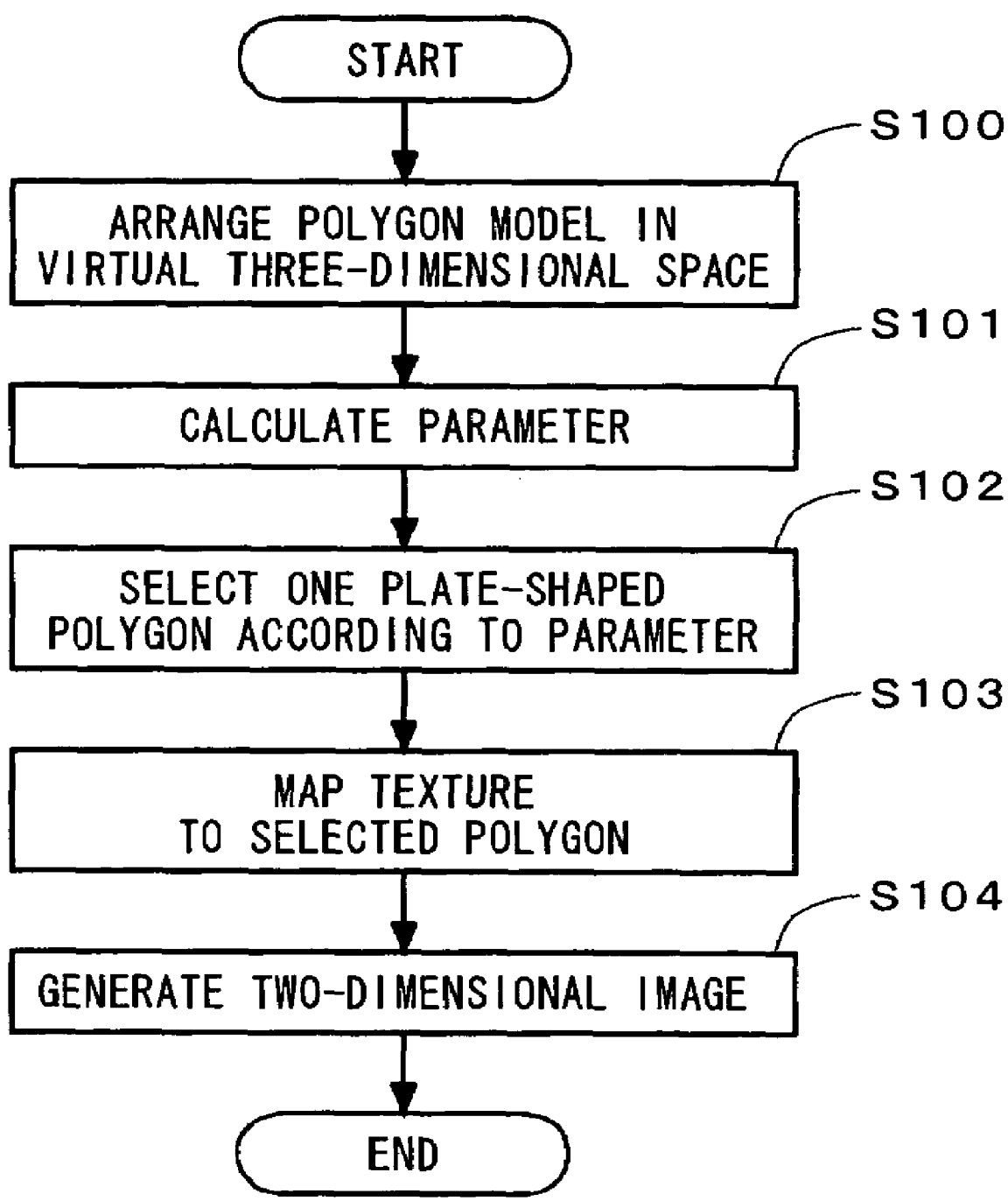
FIG. 3 is a flowchart showing the operational procedures of an image processing unit according to an embodiment of the present invention while focusing on the image generation function.

FIG. 2 is a functional block diagram in the case of representing the configuration of the image processing unit 2 while focusing on the image generation function. Further, FIG. 3 is a flowchart showing the operational procedures of the image processing unit 2 while focusing on the image generation function. As shown in FIG. 2, the image processing unit 2 comprises a model arrangement unit 30, a parameter calculation unit 31, a polygon selection unit 32, a mapping unit 33 and an image generation unit 34. To explain the correspondence with the configuration shown in FIG. 1, the model arrangement unit 30, the parameter calculation unit 31 and the polygon selection unit 32 are realized, for instance, by the CPU 10, the system memory 11 and the geometry processor 15 working together, and the mapping unit 33 and the image generation unit 34 are realized, for instance, by the CPU 10, the rendering processor 16 and the graphic memory 17 working together.

Figure 4:
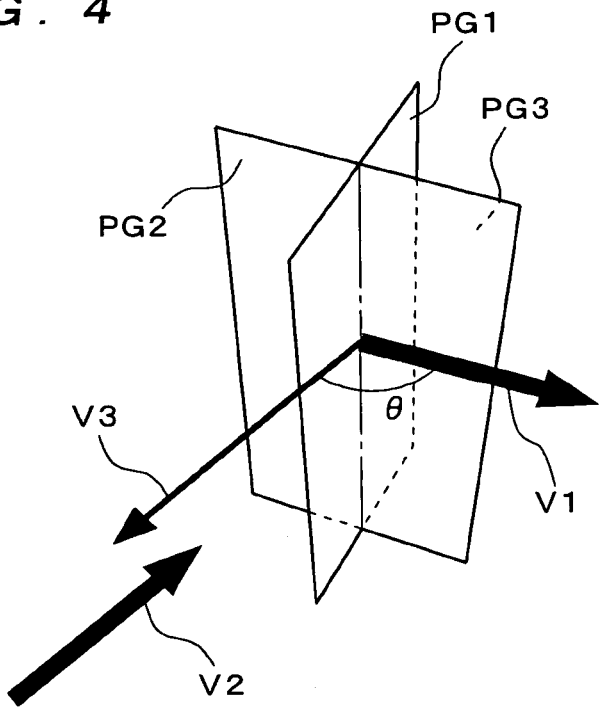
FIG. 4 is a diagram showing an example of a model configured by intersecting plate-shaped polygons.

The model arrangement unit 30 arranges a model (polygon model) configured by intersecting a plurality of plate-shaped polygons in a virtual three-dimensional space (FIG. 3: step S100). An example of this model configured by intersecting the plate-shaped polygons is shown in FIG. 4. The model illustrated with the schematic perspective view in FIG. 4 is configured by intersecting the respective plate-shaped polygons PG2, PG3 with the plate-shaped polygons PG1. Incidentally, since the plate-shaped polygon PG2 and the plate-shaped polygon PG3 are arranged so that they are mutually back-to-back, they appear to be a single plate-shaped polygon in FIG. 4 and the subsequent drawings. Nevertheless, in reality, there are two plate-shaped polygons. In this embodiment, one illustrated model corresponds to one spectator to become the display target. Specifically, the plate-shaped polygon PG1 is used to represent the appearance when viewing the spectator from the front, the plate-shaped polygon PG2 is used to represent the appearance when viewing the spectator from the right side, and the plate-shaped polygon PG3 is used to represent the appearance when viewing the spectator from the left side. This embodiment is set so that the appearance of a spectator viewed from the rear is not represented. Incidentally, when it is desirable to represent the appearance when viewing the spectator from the rear, another plate-shaped polygon should be added to be back side of the plate-shaped polygon PG1, and a texture showing such appearance should be prepared.

The parameter calculation unit 31 calculates the parameter dependent on an angle formed from a first vector set in association with a model and a second vector set in association with the line of sight of the virtual camera (FIG. 3: step S101).

Here, the first vector can be set arbitrarily so as long as it has a specific direction associated with the arrangement of the model. As shown in FIG. 4, in this embodiment, a normal vector V1 to the surface of the plate-shaped polygons PG1 is used as the first vector. Further, the second vector can be arbitrarily set so as long as it is set in association with the line of sight (imaging direction) of the virtual camera disposed in the virtual three-dimensional space. As shown in FIG. 4, in this embodiment, an inverse vector V3 of the line-of-sight vector V2 of the virtual camera is used as the second vector. Here, if the angle formed from the normal vector V1 and the inverse vector V3 is θ (refer to FIG. 4), the parameter calculation unit 31 will calculate this angle θ as the parameter. Incidentally, the line-of-sight vector V2 may be used as the second vector, and the angle formed from the line-of-sight vector V2 and the normal vector V1 may be calculated as the parameter. Further, the inner product value |V1| |V3| cos θ of the normal vector V1 as the "first vector" and the inverse vector V3 as the "second vector" may be calculated and used as the parameter.

Figure 5:
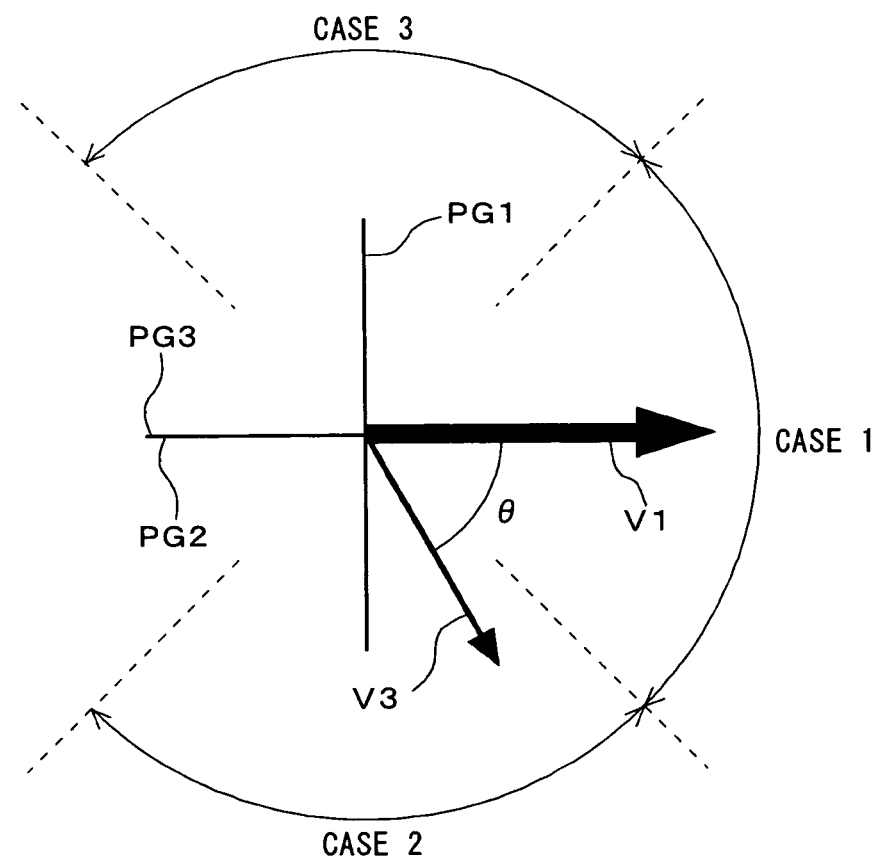
FIG. 5 is a diagram showing a plan view of the relationship between the model and respective vectors illustrated in FIG. 4.

The polygon selection unit 32 selects one among the plurality of plate-shaped polygons PG1, PG2, PG3 according to the value of angle θ as the parameter calculated with the parameter calculation unit 31 (FIG. 3: step S102). A specific example of this selection processing is explained with reference to FIG. 5. FIG. 5 is a diagram showing a plan view of the relationship between the model and respective vectors illustrated in FIG. 4. In FIG. 5, if the clockwise direction of angle θ is defined as positive and the counterclockwise direction of angle θ is defined as negative, the polygon selection unit 32 will select the plate-shaped polygon PG1 when the angle θ formed from the normal vector V1 and the inverse vector V3 is 0°≦θ<+45° and −45°≦θ<0 (case 1). Further, the polygon selection unit 32 selects the plate-shaped polygon PG2 when the angle θ formed from the normal vector V1 and the inverse vector V3 is +45°≦θ<+135° (case 2). Moreover, the polygon selection unit 32 selects the plate-shaped polygon PG3 when the angle θ formed from the normal vector V1 and the inverse vector V3 is −135°≦θ<−45° (case 3). Incidentally, this embodiment is set so that an angle θ that does not correspond to the above will not occur. In addition, the range of angles to correspond to each of the foregoing cases is merely an example and not limited to the above, and may be arbitrarily changed.

The mapping unit 33 maps a texture to one plate-shaped polygon selected with the polygon selection unit 32 (FIG. 3: step S103). A specific example of this texture mapping is shown in FIG. 6.

Figure 6A:
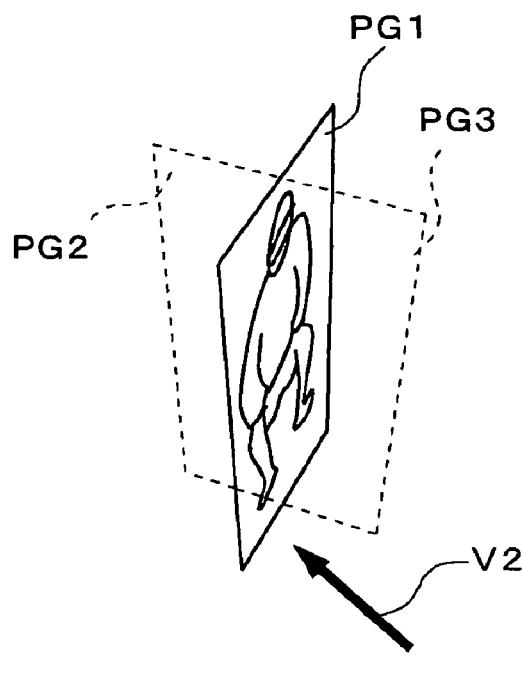
FIG. 6A to 6C are diagrams showing a specific example of texture mapping.

FIG. 6A shows an example of texture mapping in a case where the direction of the line-of-sight vector V2 of the virtual camera is facing the plate-shaped polygon PG1, and the angle θ formed from the normal vector V1 and the inverse vector V3 corresponds to case 1 described above. Here, as illustrated with the plate-shaped polygon PG1, texture representing an appearance viewing a sitting spectator from the front is mapped. Further, although the plate-shaped polygons PG2, PG3 are displayed with a dotted line in FIG. 6, these are in reality subject to processing so as to be hidden. As specific processing for hiding these plate-shaped polygons PG2, PG3, for instance, processing of nullifying the alpha value as a parameter for controlling the transparency set in the respective plate-shaped polygons PG2, PG3 (corresponds to total transmittance), or processing of managing flags so that the apexes of the respective plate-shaped polygons PG2, PG3 are not subject to drawing processing may be considered. To explain flag management in detail, when displaying only the selected plate-shaped polygon PG1, only the apex data numbers corresponding to the apex data of the apexes configuring the selected plate-shaped polygon PG1 are transferred to the index buffer in the graphic memory 17.

Figure 6B:
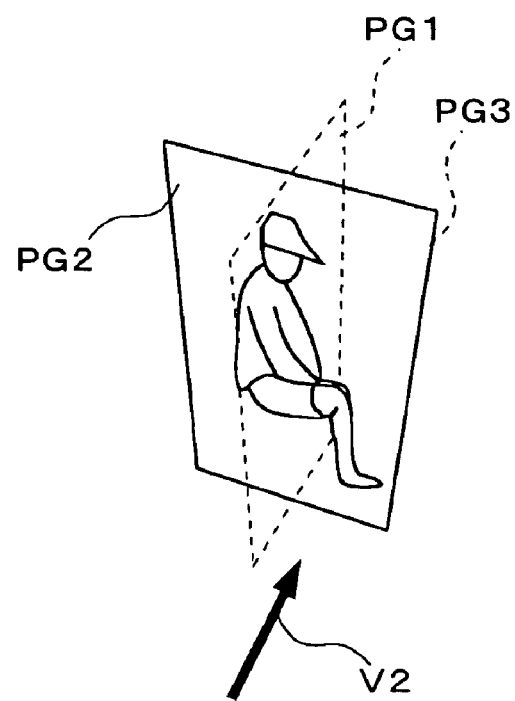

FIG. 6B shows an example of texture mapping in a case where the direction of the line-of-sight vector V2 of the virtual camera is facing the plate-shaped polygon PG2, and the angle θ formed from the normal vector V1 and the inverse vector V3 corresponds to case 2 described above. Here, as illustrated with the plate-shaped polygon PG2, texture representing an appearance viewing a sitting spectator from the right side is mapped. Further, the plate-shaped polygons PG1, PG3 are subject to processing so as to be hidden (specific example is same as above).

Figure 6C:
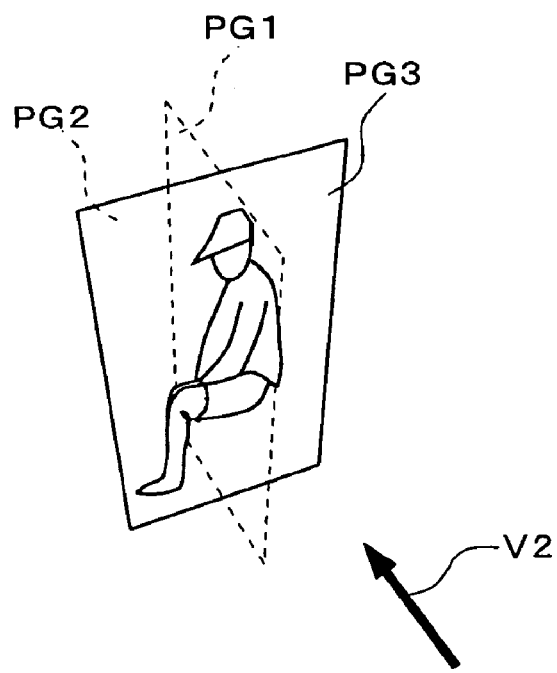

FIG. 6C shows an example of texture mapping in a case where the direction of the line-of-sight vector V2 of the virtual camera is facing the plate-shaped polygon PG3, and the angle θ formed from the normal vector V1 and the inverse vector V3 corresponds to case 3 described above. Here, as illustrated with the plate-shaped polygon PG3, texture representing an appearance viewing a sitting spectator from the left side is mapped. Further, the plate-shaped polygons PG1, PG2 are subject to processing so as to be hidden (specific example is same as above).

Subsequently, the image generation unit 34 generates a two-dimensional image obtained by performing perspective projection to the inside of the virtual three-dimensional space, including the model in which a prescribed texture is mapped to the plate-shaped polygon, on a perspective projection plane set in correspondence with a visual point of the virtual camera (FIG. 3: step S104).

Figure 7:
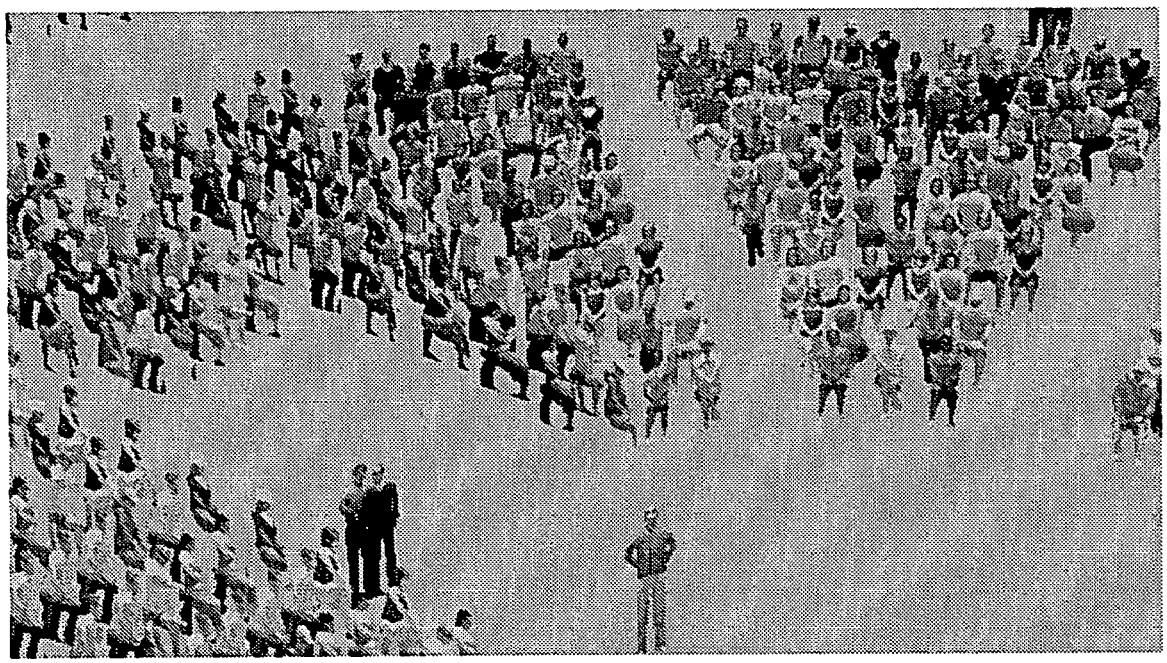
FIG. 7 is a diagram showing an example of a two-dimensional image generated with the image generation unit.

FIG. 7 shows an example of the two-dimensional image generated with the image generation unit. In FIG. 7, an image is shown as viewed from the virtual camera set at the front side of numerous spectators arranged circularly. Among such numerous spectators, the respective spectators arranged from the center to the right side are represented by the plate-shaped polygon PG1 being selected based on the foregoing processing, and texture mapping being performed to the plate-shaped polygon PG1. Further, the respective spectators arranged from the center to the left side are represented by the plate-shaped polygon PG2 being selected based on the foregoing processing, and texture mapping being performed to the plate-shaped polygon PG2.

As described above, with the game device of the first embodiment, after pre-arranging the model, one of the plate-shaped polygons is selected in correspondence to changes in the line of sight of the virtual camera, and the display is changed by mapping a prepared texture to the selected polygon. Therefore, since it is not necessary to move (for example, rotate) the respective apexes of the plate-shaped polygons configuring the model even when the line of sight of the virtual camera is changed, it is possible to reduce the computational load without deteriorating the expressiveness. In particular, when displaying numerous spectators, it is possible to considerably reduce the computational load by representing the respective spectators with the foregoing model.

Second Embodiment

Here, as processing for displaying numerous spectators, although it is possible to alleviate the processing load in comparison to conventional technology by performing the processing explained in the foregoing first embodiment to the respective models set per spectator, it is possible to seek further alleviation of the processing load by introducing the processing described below.

Figure 8:
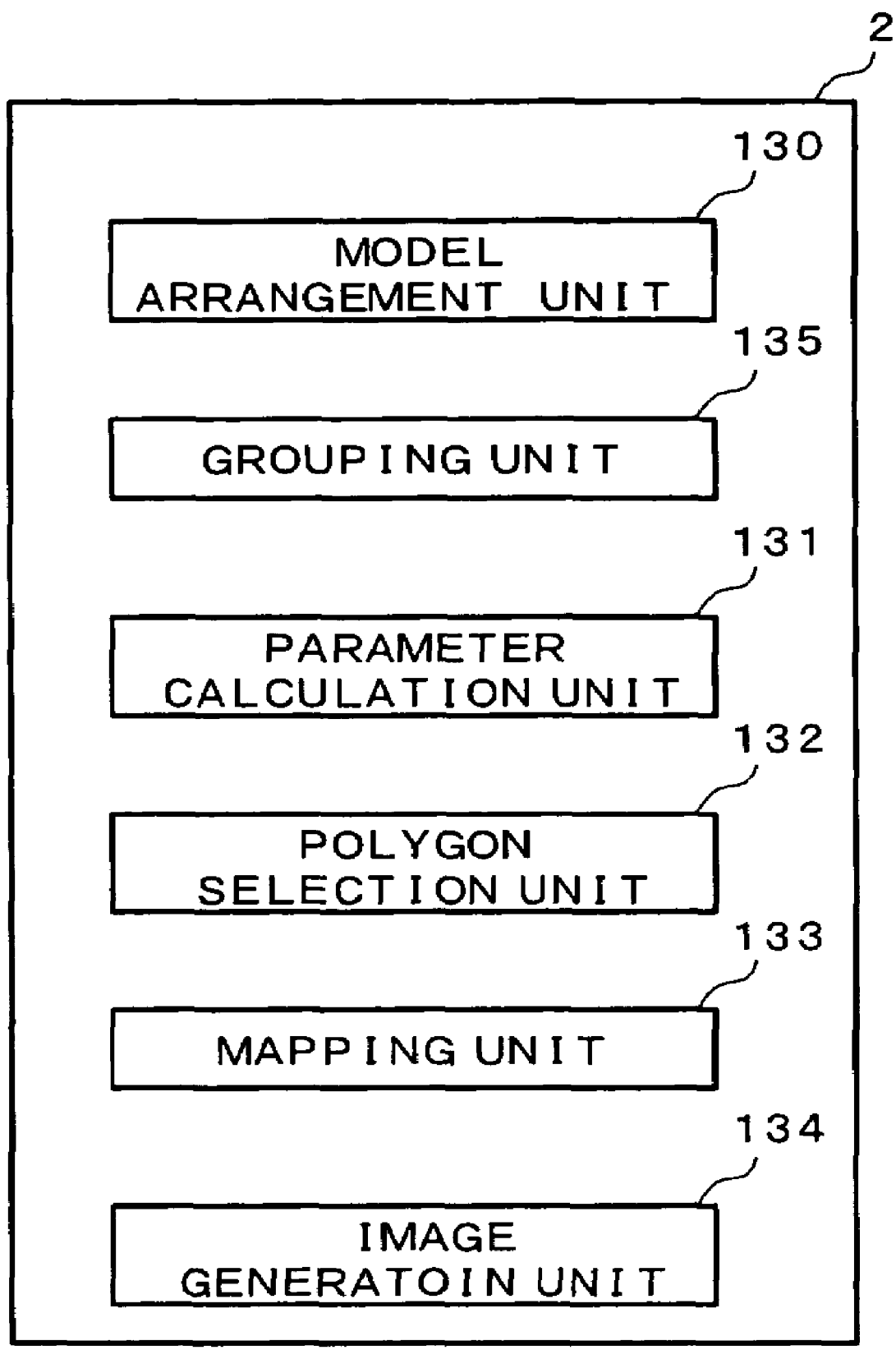
FIG. 8 is a functional block diagram in the case of representing the configuration of an image processing unit according to another embodiment of the present invention while focusing on the image generation function.
Figure 9:
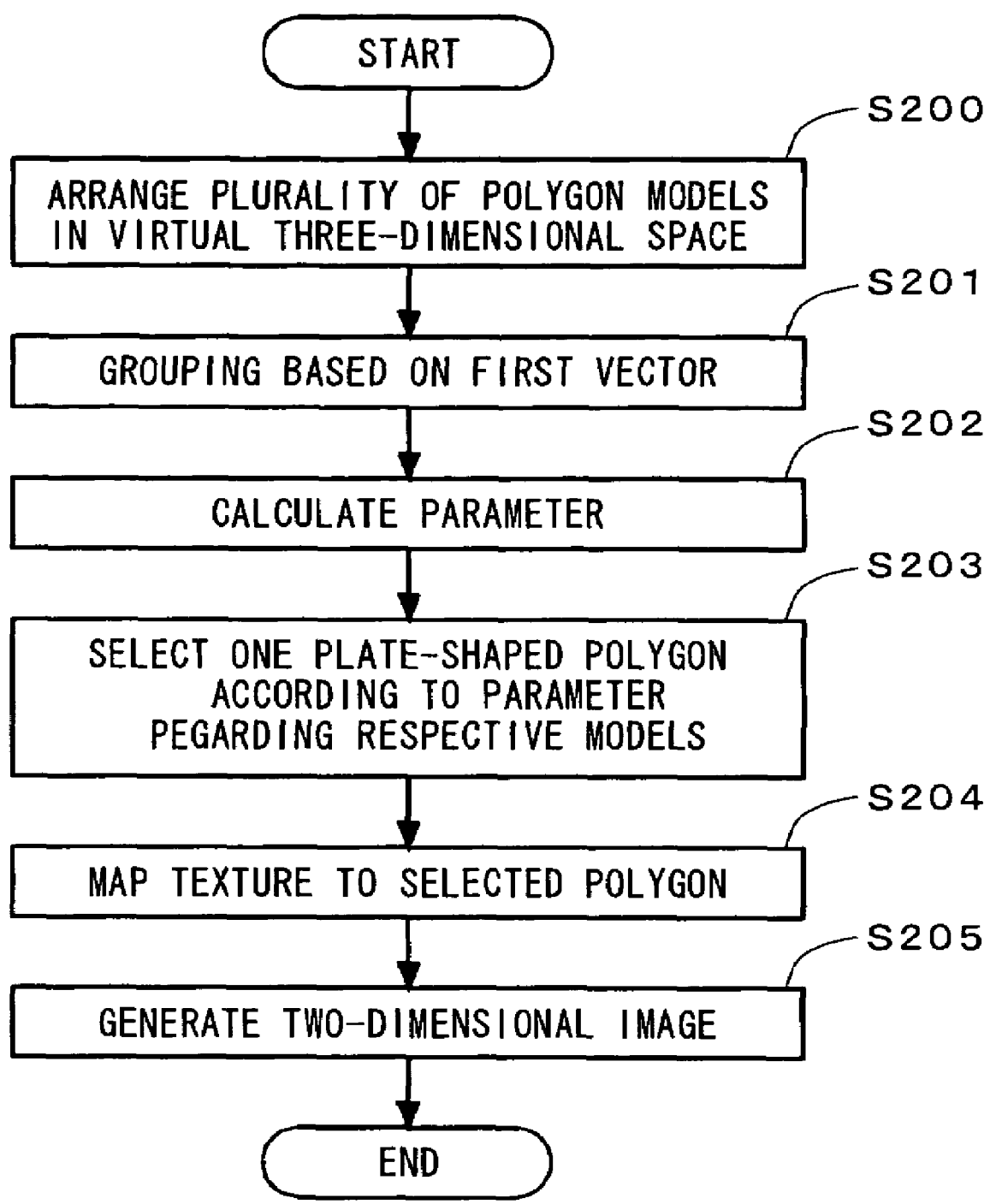
FIG. 9 is a flowchart showing the operational procedures of an image processing unit according to another embodiment of the present invention while focusing on the image generation function.

FIG. 8 is a functional block diagram in the case of representing the configuration of the image processing unit 2 while focusing on the image generation function. Incidentally, the specific hardware configuration is the same as the contents described with reference to FIG. 1, and the explanation thereof is omitted. Further, FIG. 9 is a flowchart showing the operational procedures of the image processing unit 2 while focusing on the image generation function. As shown in FIG.

8, the image processing unit 2 of the second embodiment comprises a model arrangement unit 130, a parameter calculation unit 131, a polygon selection unit 132, a mapping unit 133, an image generation unit 134 and a grouping unit 135. To explain the correspondence with the configuration shown in FIG. 1, the model arrangement unit 130, the parameter calculation unit 131, the polygon selection unit 132 and the grouping unit 135 are realized, for instance, by the CPU 10, the system memory 11 and the geometry processor 15 working together, and the mapping unit 133 and the image generation unit 134 are realized, for instance, by the CPU 10, the rendering processor 16 and the graphic memory 17 working together.

The model arrangement unit 131 arranges a model (polygon model) configured by intersecting a plurality of plate-shaped polygons in a virtual three-dimensional space (FIG. 9: step S200). Specific examples of the respective models are the same as the first embodiment described above (refer to FIG. 4).

The grouping unit 135 groups a plurality of models into groups in which the directions of the first vector set in association with each of the models coincide (FIG. 9: step S201).

Figure 10:
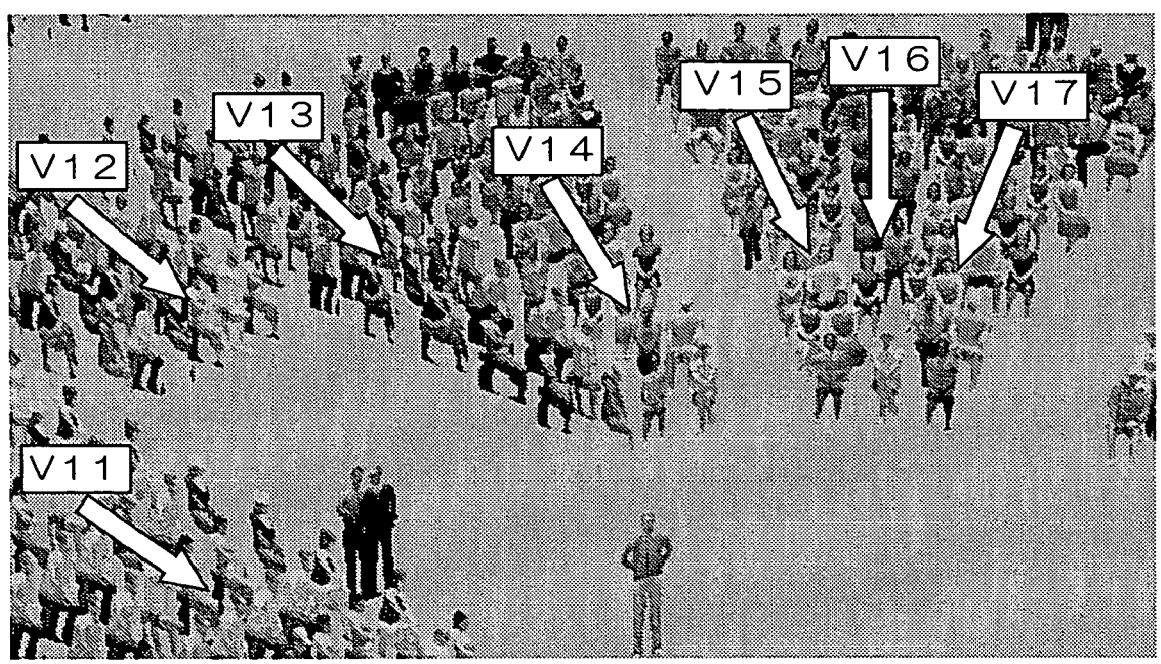
FIG. 10 is a diagram explaining the concept of grouping.

A specific example of grouping is now explained. FIG. 10 is a diagram explaining the concept of grouping in this embodiment based on the display example of spectators shown in FIG. 7 described above. As shown in FIG. 10, for instance, the respective models corresponding to one group of spectators arranged at the lower left of the diagram are grouped since the directions of the first vector set in the respective models coincide. A first vector V11 simply shows a representative example of the first vector set to each model in such one group of models. The same applies to the other spectators, and the spectators are grouped into groups in which the directions of the first vector set to the models coincide. The respective first vectors V12, V13, V14, V15, V16, and V17 represent each first vector set to each group. Incidentally, even if the respective models are arranged in different areas, such models can be set to belong to the same group so as long as the directions of the first vector coincide. For example, in FIG. 10 described above, assuming that the directions of the first vector V11 and the first vector V13 coincide, the respective models corresponding thereto can be handled as a same group. Incidentally, from a different perspective, it could be said that a single first vector commonly used in all models contained in one group is set to each group.

Figure 11:
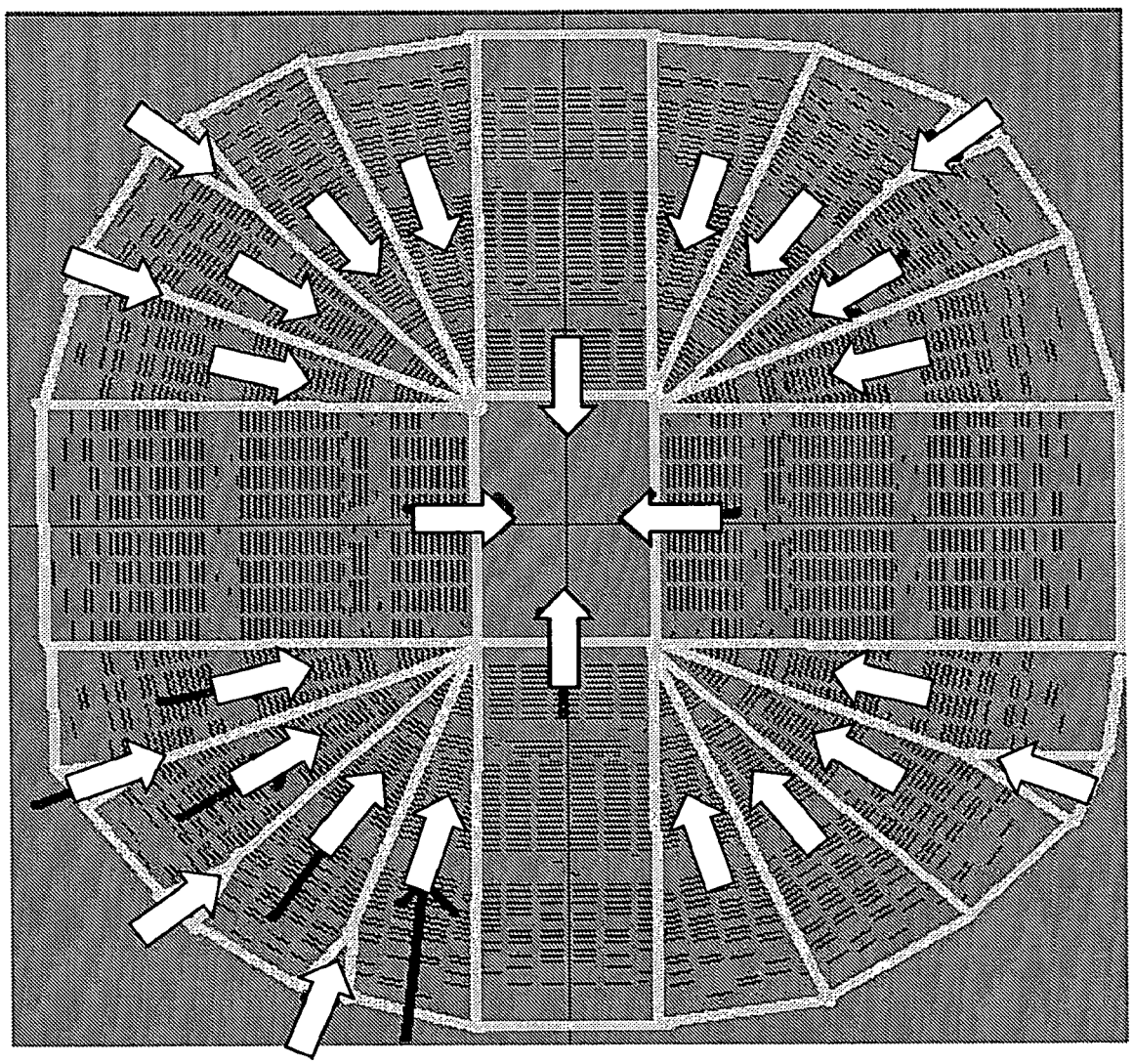
FIG. 11 is a diagram further explaining grouping based on the direction of the first vector.

FIG. 11 is a diagram further explaining grouping based on the direction of the first vector, and illustrates a case where a sports arena (stadium) is arranged in the virtual three-dimensional space. This stadium has a game space (for instance, a tennis court or soccer field) arranged in the center, and the spectators' seats are arranged circularly around the periphery thereof. In these kinds of spectators' seats, an area is partitioned for each range in which the front directions upon spectators viewing the game space coincide, and directions of the first vector of the respective models arranged in the respective areas coincide. In FIG. 11, one first vector of the respective models coinciding with the respective areas is representatively displayed as an outline arrow.

The parameter calculation unit 131 performs to each of the groups processing for calculating the parameter dependent on an angle formed from the first vector and a second vector set in association with the line of sight of the virtual camera regarding one of the models belonging to the same group (FIG. 9: step S202). To explain with reference to FIG. 10, for instance, with respect to a group having the first vector V11 (hereinafter referred to as "group 1"), parameter calculation processing is performed to only one model among the models contained in such "group 1". The calculated parameter is commonly used in all models belonging to group 1 at the time of polygon selection described later. With respect to a group having the first vector V12 (hereinafter referred to as the "group 2"), a group having the first vector V13 (hereinafter referred to as "group 3"), a group having the first vector V14 (hereinafter referred to as "group 4"), a group having the first vector V15 (hereinafter referred to as "group 5"), a group having the first vector V16 (hereinafter referred to as "group 6"), and a group having the first vector V17 (hereinafter referred to as "group 7"), the same applies to each of these groups. Incidentally, the specific method of calculating the parameter is the same as the first embodiment described above (refer to FIG. 4).

The polygon selection unit 132 performs to each group processing for selecting as a display target one among the plurality of plate-shaped polygons configuring the model according to the parameter calculated regarding the group with respect to each of the models belonging to the same group (FIG. 9: step S203). The specific contents of the selection processing are the same as the first embodiment described above (refer to FIG. 5). Thereby, for instance, with respect to group 1, collective processing can be performed for each group as in selecting the plate-shaped polygon PG2 among the plurality of plate-shaped polygons PG1, PG2, PG3 regarding all models belonging to this group.

Figures 12, 13:
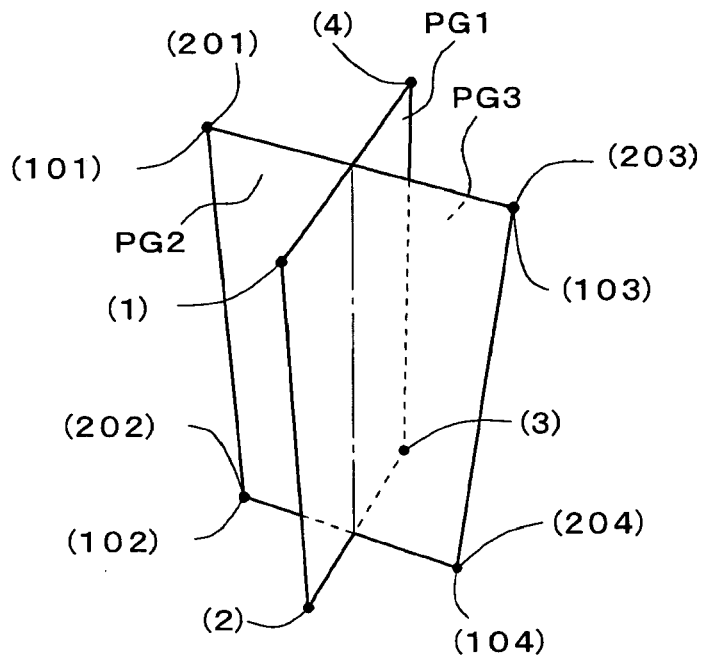
FIG. 12 is a diagram explaining the apex data numbers set in the respective models.
FIG. 13 is a diagram showing a data structure example of the apex data numbers of plate-shaped polygons.

The data structure example of the apex data numbers of the plate-shaped polygons regarding the models belonging to the respective groups is now explained. FIG. 12 is a diagram explaining the apex data numbers set in the respective models. FIG. 13 is a diagram showing the data structure example of the apex data numbers of the plate-shaped polygons. Incidentally, the apex data numbers illustrated in FIG. 13 show a case where 25 models (for 25 spectators) belong to a single group. As shown in FIG. 12 and FIG. 13, the apex data numbers of the plate-shaped polygons are not serial in each model, and are set to be serial numbers in each of the plate-shaped polygons PG1, PG2, PG3.

Specifically, foremost, the apex data numbers to the plate-shaped polygon PG1 of the first model are (1, 2, 3, 4), the apex data numbers to the plate-shaped polygon PG1 of the second model are (5, 6, 7, 8), the apex data numbers to the plate-shaped polygon PG1 of the third model are (9, 10, 11, 12), the apex data numbers to the plate-shaped polygon PG1 of the twenty-fifth model are (97, 98, 99, 100), and apex data numbers are set serially in relation to the plate-shaped polygons PG1 of the respective models.

Similarly, the apex data numbers to the plate-shaped polygon PG2 of the first model are (101, 102, 103, 104), the apex data numbers to the plate-shaped polygon PG2 of the second model are (105, 106, 107, 108), the apex data numbers to the plate-shaped polygon PG2 of the third model are (109, 110, 111, 112), . . . , the apex data numbers to the plate-shaped polygon PG2 of the twenty-fifth model are (197, 198, 199, 200), and apex data numbers are set serially in relation to the plate-shaped polygons PG2 of the respective models.

Similarly, the apex data numbers to the plate-shaped polygon PG3 of the first model are (201, 202, 203, 204), the apex data numbers to the plate-shaped polygon PG3 of the second model are (205, 206, 207, 208), the apex data numbers to the plate-shaped polygon PG3 of the third model are (209, 210, 211, 212), . . . , the apex data numbers to the plate-shaped polygon PG3 of the twenty-fifth model are (297, 298, 299, 300), and apex data numbers are set serially in relation to the plate-shaped polygons PG3 of the respective models.

By setting the apex data numbers as described above, for instance, when the plate-shaped polygon PG1 is selected as the display target regarding the respective models belonging to a certain group (group 1 for example), the apex data numbers 1 to 100 will be managed as an index showing the plate-shaped polygons of the display target. Similarly, when the plate-shaped polygon PG2 is selected as the display target regarding the respective models belonging to a certain group, the apex data numbers 101 to 200 will be managed as an index showing the plate-shaped polygons of the display target. Similarly, when the plate-shaped polygon PG3 is selected as the display target regarding the respective models belonging to a certain group, the apex data numbers 201 to 300 will be managed as an index showing the plate-shaped polygons of the display target.

The texture mapping unit 133 maps a prescribed texture to the plate-shaped polygon selected with the polygon selection unit regarding each of the plurality of models (FIG. 9: step S204). The specific example of texture mapping to the respective models is the same as the first embodiment described above (refer to FIG. 6).

The image generation unit 134 generates a two-dimensional image obtained by performing perspective projection to the inside of the virtual three-dimensional space, in which the plurality of models mapped with the texture are arranged, on a perspective projection plane set in correspondence with a visual point of the virtual camera (FIG. 9: step S205). The specific example of the generated two-dimensional image is the same as the first embodiment described above (refer to FIG. 7).

With the game device of the second embodiment described above, after pre-arranging the model, one of the plate-shaped polygons is selected in correspondence to changes in the line of sight of the virtual camera, and the display is changed by mapping a prepared texture to the selected polygon. Therefore, since it is not necessary to move (rotate) the respective apexes of the plate-shaped polygons configuring the model even when the line of sight of the virtual camera is changed, it is possible to reduce the computational load without deteriorating the expressiveness. Further, by judging the selected polygon in each of the respective groups regarding one of the models belonging to such group, and applying the judgment result to all other models belonging to the same group, the computational load of parameter calculation processing and polygon selection processing will be considerably reduced. Thereby, even if the number of spectators as the display target is extremely large (for example, several ten thousand people), it is possible to considerably reduce the computational load without deteriorating the expressiveness.

Other Embodiments

Incidentally, the present invention is not limited to the subject matter of the respective embodiments described above, and may be modified and implemented variously within the scope of the gist of this invention. For example, the model to be arranged in the virtual three-dimensional space is not limited to the model illustrated in FIG. 3, and the model may be configured by intersecting more polygons. When using this kind of model, it is possible to improve the expressiveness. Further, the shape of the respective plate-shaped polygons is not limited to the illustrated quadrangular shape.

Further, the model arrangement unit in each of the foregoing embodiments may also arrange the model so that the direction of the first vector follows the position of the target arranged in the virtual three-dimensional space while maintaining a definite relation. A specific example of this is explained with reference to FIG. 14. As an example of a target arranged in the virtual three-dimensional space, considered is a ball (tennis ball, soccer ball, etc.) moving in the virtual three-dimensional space. As shown in FIG. 14D, this ball exists respectively at the positions of (x1, y1, z1), (x2, y2, z2), (x3, y3, z3) at time t=t1, t2, t3. Here, for example, the model is arranged while maintaining the relationship of the direction of the first vector facing and following the foregoing ball position. Specifically, FIG. 14A shows the arrangement of the model at time t1, FIG. 14B shows the arrangement of the model at time t2, and FIG. 14C shows the arrangement of the model at time t3. By arranging the model like this, it is possible to display the spectator according to the game progress. For instance, if the line-of-sight vector of the virtual camera is facing the direction toward the plate-shaped polygon PG1 shown in FIG. 14B, the plate-shaped polygon PG2 becomes the display target at time t1 and the right side of the spectator can be displayed, the plate-shaped polygon PG1 becomes the display target at time t2 and the front of the spectator can be displayed, and the plate-shaped polygon PG3 becomes the display target at time t3 and the left side of the spectator can be displayed. In other words, it is possible to display a scene where the spectators follow the movement of the ball by moving their entire body toward such ball.

Further, in the foregoing embodiments, although the subject to be represented with the model assumed numerous spectators watching a sporting event or the like, the subject is not limited to spectators.

Moreover, in the foregoing embodiments, although the game device was realized by causing a computer including hardware such as a CPU to execute a prescribed program, the respective functional blocks provided in the game device may also be realized with dedicated hardware or the like.

Furthermore, in the foregoing embodiments, although a game device was used as an example of the image generation device according to the present invention, the application scope of this invention is not limited to a game device. For instance, the present invention can also be applied to a simulator or the like for a user to experience a simulation of an event (driving operation for instance) of the actual world.

I claim:

1. A computer-readable storage medium storing instructions which, when executed by a processor, perform a method for generating an image of a virtual three-dimensional space viewed from a virtual camera, the method comprising steps, performed by the processor, of:
   arranging a model configured by intersecting a plurality of plate-shaped polygons in said virtual three-dimensional space;
   calculating a parameter dependent on an angle formed from a first vector set in association with said model and a second vector set in association with the line of sight of said virtual camera;
   selecting as a display target one among said plurality of plate-shaped polygons configuring said model according to said parameter;
   mapping a prescribed texture to said plate shaped polygon selected with said polygon selection unit; and
   generating a two-dimensional image obtained by performing perspective projection to the inside of said virtual three-dimensional space, in which said model mapped with said texture is arranged, on a perspective projection plane set in correspondence with a visual point of said virtual camera.

2. A computer-readable storage medium storing instructions which, when executed by a processor, perform a method for generating an image of a virtual three-dimensional space viewed from a virtual camera, the method comprising steps, performed by the processor, of:

arranging a plurality of models each configured by intersecting a plurality of plate-shaped polygons in said virtual three-dimensional space;

grouping said plurality of models into groups in which the directions of a first vector set in association with each of said models coincide;

performing to each of said groups processing for calculating a parameter dependent on an angle formed from said first vector and a second vector set in association with the line of sight of said virtual camera regarding one of said models belonging to the same group;

performing to each of said groups processing for selecting as a display target one among said plurality of plate-shaped polygons configuring said model according to said parameter calculated regarding said group regarding each of said models belonging to the same group;

mapping a prescribed texture to said plate-shaped polygon selected with said polygon selection unit regarding each of said plurality of models; and generating a two-dimensional image obtained by performing perspective projection to the inside of said virtual three-dimensional space, in which said plurality of models mapped with said texture are arranged, on a perspective projection plane set in correspondence with a visual point of said virtual camera.

3. The computer-readable medium according to claim 1 or claim 2, wherein said first vector is a normal vector to the surface of any one of said polygons configuring said model.

4. The computer-readable medium according to claim 1 or claim 2, wherein said second vector is a line-of-sight vector showing the line of sight of said virtual camera, or an inverse vector thereof.

5. The computer-readable medium according to claim 1 or claim 2, wherein said parameter is the angle itself formed from said first vector and said second vector, or an inner product value of said first vector and said second vector.

6. The computer-readable medium according to claim 1 or claim 2, wherein said model arrangement unit arranges said model so that the direction of said first vector follows the position of a target arranged in said virtual three-dimensional space while maintaining a definite relation.

7. An image generation device for generating an image of a virtual three-dimensional space viewed from a virtual camera, comprising:

a computer-readable storage medium storing instructions; and a processor for executing the instructions to perform steps of:

arranging a model configured by intersecting a plurality of plate-shaped polygons in said virtual three-dimensional space;

calculating a parameter dependent on an angle formed from a first vector set in association with said model and a second vector set in association with the line of sight of said virtual camera;

selecting as a display target one among said plurality of plate-shaped polygons configuring said model according to said parameter;

mapping a prescribed texture to said plate shaped polygon selected with said polygon selection unit; and generating a two-dimensional image obtained by performing perspective projection to the inside of said virtual three-dimensional space, in which said model mapped with said texture is arranged, on a perspective projection plane set in correspondence with a visual point of said virtual camera.

8. An image generation device for generating an image of a virtual three-dimensional space viewed from a virtual camera, comprising:

a computer-readable storage medium storing instructions; and a processor for executing the instructions to perform steps of:

arranging a plurality of models each configured by intersecting a plurality of plate-shaped polygons in said virtual three-dimensional space;

grouping said plurality of models into groups in which the directions of a first vector set in association with each of said models coincide;

performing to each of said groups processing for calculating a parameter dependent on an angle formed from said first vector and a second vector set in association with the line of sight of said virtual camera regarding one of said models belonging to the same group;

performing to each of said groups processing for selecting as a display target one among said plurality of plate-shaped polygons configuring said model according to said parameter calculated regarding said group regarding each of said models belonging to the same group;

mapping a prescribed texture to said plate-shaped polygon selected with said polygon selection unit regarding each of said plurality of models; and generating a two-dimensional image obtained by performing perspective projection to the inside of said virtual three-dimensional space, in which said plurality of models mapped with said texture are arranged, on a perspective projection plane set in correspondence with a visual point of said virtual camera.

9. The image generation device according to claim 7 or claim 8, wherein said first vector is a normal vector to the surface of any one of said polygons configuring said model.

10. The image generation device according to claim 7 or claim 8, wherein said second vector is a line-of-sight vector showing the line of sight of said virtual camera, or an inverse vector thereof.

11. The image generation device according to claim 7 or claim 8, wherein said parameter is the angle itself formed from said first vector and said second vector, or an inner product value of said first vector and said second vector.

12. The image generation device according to claim 7 or claim 8, wherein said model is arranged so that the direction of said first vector follows the position of said target arranged in said virtual three-dimensional space while maintaining a definite relation.

* * * * *